Patented June 27, 1939

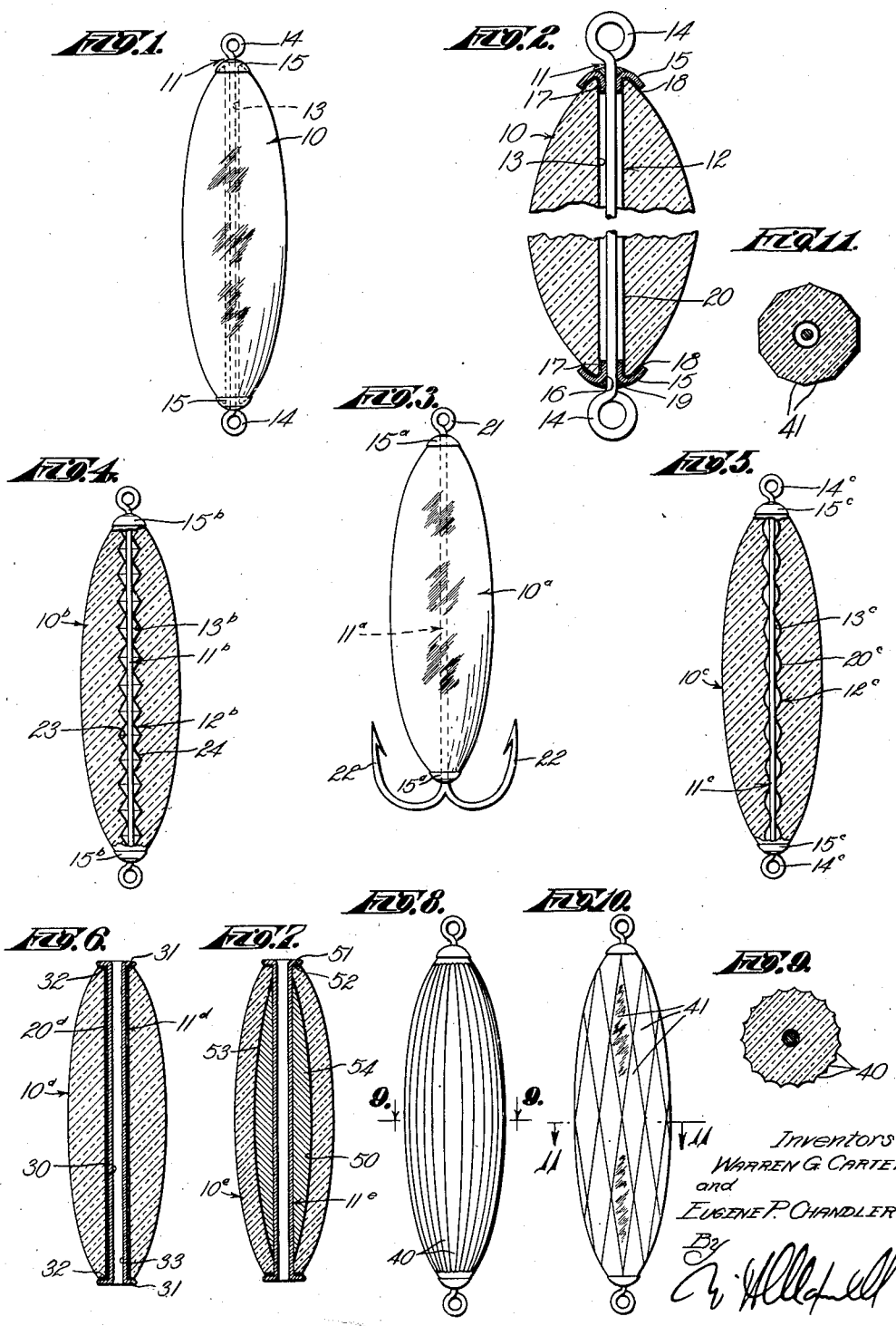

2,163,666

UNITED STATES PATENT OFFICE 2,163,666

FISHING JIG

Warren G. Carter and Eugene P. Chandler, Ocean Park, Calif.

Application October 19, 1936, Serial No. 106,303

8 Claims. (Cl. 43—42)

This invention relates to a device useful in fishing and relates more particularly to a fishing jig. It is an object of this invention to provide a simple, practical fishing jig that is particularly effective in attracting fish.

It is another object of the invention to provide a fishing jig that effectively reflects light when submerged in water so as to be effective in attracting fish, or causing the fish to come within range of the hooks.

It is another object of the invention to provide a fishing jig in which the body is formed of glass or other transparent material that is provided with an interior reflecting surface or surfaces.

It is another object of the invention to provide a fishing jig of the character mentioned in which the light reflecting surfaces are fully protected against the action of the water.

It is another object of the invention to provide a fishing jig of the character mentioned in which the exterior of the transparent body may be finished or formed to reflect and/or refract light when the jig is submerged in water.

It is another object of the invention to provide a fishing jig of the character mentioned that embodies novel and improved means for mounting the glass body on a stem or shank so that the ends of the body are sealed against the entrance of water, and so that the body is maintained out of direct contact with the metal shank. The body in being held out of direct contact with the metal shank, is less subject to breakage.

It is a further object of the invention to provide a fishing jig of the character mentioned in which the transparent body having the interior reflecting means, may be colored so that the reflected light is of a given color to be particularly attractive to certain classes of fish.

Further objects and features of the invention will be best and more fully understood from the following detailed description of typical preferred forms and applications of the invention, throughout which description reference is had to the accompanying drawing, in which:

Fig. 1 is a side elevation of one embodiment of the invention. Fig. 2 is an enlarged vertical detailed sectional view of the jig illustrated in Fig. 1. Fig. 3 is a side elevation of a form of the invention embodying hooks. Fig. 4 is a view of another embodiment of the invention showing the central main portion of the jig in longitudinal cross section. Fig. 5 is a view similar to Fig. 4 illustrating still another embodiment of the invention. Fig. 6 is a longitudinal cross sectional view of another form of the invention. Fig. 7 is a longitudinal cross section of another embodiment of the invention. Fig. 8 is a side elevation of another form of the invention. Fig. 9 is a transverse detailed sectional view taken as indicated by line 9—9 on Fig. 8. Fig. 10 is a side elevation of still another embodiment of the invention, and Fig. 11 is a transverse detailed sectional view taken on line 11—11 in Fig. 10.

In accordance with its broader principles, the invention may be embodied in forms varying somewhat in shape, size and other characteristics. In the followng detailed disclosure, we will describe several typical embodiments, it being understood that the invention is not to be taken as limited or restricted to the specific details set forth, but is to be considered as including any features or modifications that may fall within the scope of the claims.

The form of fishing jig illustrated in Figs. 1 and 2 of the drawing includes, generally, a body 10, a stem or shank 11 extending through the body, and light reflecting means 12 within the body.

The body 10 is formed of transparent material such as glass, or the like. In accordance with the present invention, the body 10 may be formed of either clear or colored light transmitting material, depending upon the particular use to which the jig is to be put. It has been found that certain classes or species of fish are more readily attracted by colored objects and objects of certain specific colors. Whether the body 10 is colored or not, it is transparent to transmit light from the light reflecting means 12. The body 10 is an elongate integral part of substantially round cross section. In the preferred construction the body 10 is rounded both transversely and longitudinally, being ellipsoidal in its general configuration. A central longitudinal opening 13 extends through the body 10 from one end to the other. In the particular embodiment of the invention being described, the opening 13 is of round cross section and of uniform diameter throughout its length. The body 10 illustrated in the drawing has a smooth regular external surface, it being understood that the exterior of the body may be otherwise finished or shaped, as will be subsequently described in connection with the descriptions of the jigs illustrated in Figs. 8 and 9 and in Fig. 10.

The stem or shank 11 is provided to facilitate the attachment of the jig to a line and to facilitate the attachment of hooks, leaders, etc., to the jig. The shank 11 may be in the nature of a wire or rod of suitable gauge, and extends longitudinally through the body opening 13. In accordance with the invention, the shank 11 extends completely through the opening 13 to project from the opposite ends of the body 10. Suitable means is provided at one or both ends of the shank 11 to facilitate the attachment of the jig to a line, and/or for carrying leaders, etc. In the form of the invention being described, a loop or eye 14 is provided on each of the projecting ends of the shank 11.

The manner of mounting the body 10 on the shank 11 is an important feature of the invention, as it operates to seal the opposite ends of the opening 13 and holds the body 10 spaced from the metal shank 11 to lessen the danger of breaking the glass body. A cup washer or cap 15 is provided at each end of the body 10. The caps 15 have central openings 16 passing the shank 11, and have flanges or rims 17 around the openings 16 projecting into the ends of the body opening 13. Washers 18 of rubber, or the like, are arranged between the caps 15 and the ends of the body. The washers 18 may cover the entire inner sides of the caps 15 and are provided to seal between the body 10 and the caps 15. The caps 15 and the washers 18 are shaped so as to closely or accurately fit the ends of the body 10 and close the ends of the body opening 13. The caps 15 are permanently held in the sealing positions by welding or solder 19 in the concaved outer ends of the caps attaching the caps to the shank 11. The solder 19 forms a seal between the shank 11 and the caps 15 and maintains the caps and washers 18 in sealing engagement with the body 10. The shank 11 is of considerably less diameter than the body opening 13 and the rims 17 of the caps operate to center the shank in the opening 13 and hold it spaced from the walls of the opening. The construction just described effectively closes the opposite ends of the body opening 13, seals around the shank 11, and holds the metal shank spaced from the glass body 10.

The light reflecting means 12 is provided to cause the jig to shine or reflect light when in the water to attract the fish and to cause the fish to bite or become snagged. The reflecting means 12 includes a light reflecting surface 20 on the walls of the body opening 13. The walls of the opening 13 may be silvered or otherwise treated to provide an effective light reflecting surface. The light reflecting surface 20 may extend throughout the length of the opening 13 and may be cylindrical, covering the entire surface of the opening. If desired, the reflecting surface 20 may be crackled or interrupted. The light reflecting means 12 provides a cylindrical reflecting surface 20 extending throughout the length of the body 10 to reflect, in various directions, the light transmitted by the transparent body 10. In the event that the body 10 is formed of colored glass or other colored light transmitting material, the light reflected by the surface 20 is accordingly colored and may be more effective in attracting the fish. The reflecting surface 20, being on the walls of the body opening 13, is fully protected against the action of water when the jig is in use. The caps 15 and washers 18 positively prevent the entrance of water into the opening 13 so that the material forming the light reflecting surface 20 cannot be injured through the action of water. The shank 11 is spaced from the walls of the opening 13 so that it does not engage or rub against the light reflecting coating.

The form of our invention illustrated in Fig. 3 of the drawing is similar, generally, to the embodiment just described, that is, it includes a body 10ᵃ of transparent material, a shank 11ᵃ extending through the body, and sealing caps 15ᵃ attached to the shank and closing the opposite ends of the body. In this embodiment of the invention, a loop or eye 21 is provided on the upper projecting end of the shank 11ᵃ, while hooks 22 are provided on the projecting lower end of the shank. We have illustrated two like hooks 22 curved upwardly and outwardly from the lower end of the body 10ᵃ. In accordance with the usual practice, the upper ends of the hooks 22 may be pointed and barbed. The outwardly curved hooks 22 aid in holding the lower cap 15ᵃ in sealing engagement with the body 10ᵃ. It is to be understood that the body 10ᵃ may be provided with internal light reflecting means such as described above, and that the exterior of the body may be shaped in various manners to be more attractive to the fish as will be subsequently described.

The form of the invention illustrated in Fig. 4 of the drawing includes an ellipsoidal body 10ᵇ of glass or other suitable light transmitting material, a shank 11ᵇ extending through a longitudinal opening 13ᵇ in the body, and light reflecting means 12ᵇ. The body 10ᵇ may be similar to or identical with the body 10 described above, while the shank 11ᵇ may be similar to the shank 11, or similar to the shank 11ᵃ as desired.

The light reflecting means 12ᵇ includes a plurality of flat angularly related light reflecting surfaces within the body 10ᵇ. A plurality of annular grooves 23 is provided in the walls of the body opening 13ᵇ. The faces or walls of the grooves 23 are flat and pitched or inclined as clearly illustrated in the drawing. A coating or covering of light reflecting material 24 is provided on the walls of the grooves 23 to provide a longitudinal series of conical or inclined reflecting surfaces for reflecting light outwardly in various directions. The opposite ends of the body opening 13ᵇ are closed by sealing caps 15ᵇ attached to the projecting ends of the shank 11ᵇ. The sealing caps 15ᵇ operate in the same manner as the caps 15 described above, and positively prevent the entrance of water into the opening 13ᵇ. The light reflecting means 12ᵇ is particularly effective as it reflects off light, passing into the body, in different directions.

The form of our invention illustrated in Fig. 5 of the drawing includes an ellipsoidal body 10ᶜ of transparent material having a central longitudinal opening 13ᶜ passing a shank 11ᶜ. The shank 11ᶜ passes through the opening 13ᶜ with suitable clearance and projects from the opposite ends of the body 10ᶜ. Loops or eyes 14ᶜ may be provided on the projecting ends of the shank, and sealing caps 15ᶜ are provided on the shank to seal off the opposite ends of the body opening 13ᶜ. Light reflecting means 12ᶜ is provided in the body 10ᶜ and includes a waved or corrugated reflecting surface 20ᶜ on the walls of the body opening 13ᶜ. A plurality of annular or circumferentially rounded corrugations are provided in the wall of the opening 13ᶜ and are coated or covered with light reflecting material providing the reflecting surface 20ᶜ. The corrugated reflecting surface 20ᶜ extends the entire length of the body opening 13ᶜ. The shank 11ᶜ passes through the opening 13ᶜ with suitable clearance so that it is not in contact with the corrugated reflecting surface 20ᶜ. The sealing caps 15ᶜ operate to seal the opposite ends of the opening 13ᶜ so that the reflecting surface is protected from the water. The corrugated reflecting surface 20ᶜ is particularly effective in reflecting light in various directions and makes the jig very bright and shiny when submerged in the water.

The embodiment of our invention illustrated in Fig. 6 of the drawing includes an ellipsoidal body 10ᵈ of transparent material provided with a central longitudinal opening 30. The walls of the opening 30 may be silvered or covered with other light reflecting material to provide a cylindrical light reflecting surface 20ᵈ. A tubular stem 11ᵈ extends through the opening 30. The stem 11ᵈ preferably extends completely through the opening 30 to project from the opposite ends of the body 10ᵈ. The opposite projecting ends of the tubular stem 11ᵈ are flanged or provided with annular outwardly projecting flanges 31. Washers 32 of rubber or the like are arranged between the flanges 31 and the ends of the body 10ᵈ. The flanges and washers operate to seal the ends of the opening 30 and center the stem 11ᵈ so that it passes through the opening 30 with suitable clearance. The opening 33 in the stem 11ᵈ is adapted to pass a line, leader, shank of a hook, etc. It will be readily apparent how the jig shown in Fig. 6 may be readily mounted in a line at any point.

The form of the invention illustrated in Fig. 7 of the drawing is similar to the embodiment just described in including an ellipsoidal body 10ᵉ of transparent material having a central longitudinal opening 50 passing a tubular stem 11ᵉ. Flanges 51 and washers 52 are provided at the opposite ends of the shank 11ᵉ to close the opposite ends of the opening 50. In this particular embodiment of the invention, the opening 50 is enlarged between its ends and may follow generally, the external configuration of the ellipsoidal body 10ᵉ. The walls of the opening 50 are silvered to provide a light reflecting surface 53 for attracting the fish. In accordance with this form of the invention, the opening 50 carries a material 54 having a relatively high specific gravity. The material 54 may occupy the annular space left in the opening 50 around the stem 11ᵉ and is retained in the opening by the stem which closely fits the end portions of the opening. The flanges 51 and washers 52 further aid in retaining the material 54 in the opening. In practice, the heavy material 54 may be any suitable material, for example, white lead. This form of the invention, in including the material 54 of a comparatively high specific gravity, may operate as a sinker to insure the proper tautness in the line.

Figs. 8 and 9 and Fig. 10 illustrate two typical surfaces that may be provided on the transparent body of the jig. It is to be understood that the surface configurations illustrated in Figs. 8 and 9 and Fig. 10 may be applied to the bodies of any of the forms described. In Figs. 8 and 9 the exterior of the transparent body is provided with a plurality of longitudinal flutes 40. The flutes 40 may extend the entire length of the body and may converge toward its ends. In the particular case illustrated in the drawing, the grooves or flutes 40 are rounded and occupy substantially the entire surface of the body. The flutes 40 aid in reflecting and refracting the light to make the jig more attractive. The body of the jig illustrated in Fig. 10 of the drawing is provided with a plurality of flat diamond shaped surfaces 41. The several surfaces 41 may occupy substantially the entire surface of the transparent jig body and are angularly related so as to have a prismatic action causing effective refraction and reflection of light. The invention contemplates the shaping and surfacing of the transparent body in various manners, and is, therefore, not to be considered as limited or restricted to the two typical illustrations in Figs. 8 and 9 and Fig. 10.

The present invention provides a fishing jig that is particularly simple and inexpensive of manufacture and that is effective in attracting fish. The light reflecting surface within the transparent body is adapted to reflect light outwardly in all directions so that the jig shines when in the water. The light reflecting material on the walls of the body opening is protected against the action of water by the sealing caps and washers closing the ends of the body opening. The sealing caps further operate to space the shank from the glass body, thus lessening the danger of breaking the body. The body being formed of glass is of considerably greater specific gravity than water so that the jig may operate as a sinker, and provided for the proper tautness in the line. The provision of the reflecting surface directly on the transparent body of the jig eliminates the necessity of special shiny or light reflecting parts, etc.

Having described only typical preferred forms and applications of our invention, we do not wish to limit ourselves to the specific details set forth, but wish to reserve to ourselves any variations or modifications that may appear to those skilled in the art or fall within the scope of the following claims:

Having described our invention, we claim:

1. A fishing jig including, an elongate body of transparent material having a longitudinal opening extending therethrough, light reflecting material on the wall of the opening, and a multiplicity of light reflecting facet surfaces on the exterior of the body.

2. A fishing jig including, a tubular body of transparent material, and light reflecting material covering the internal surface of the body throughout substantially its entire length, there being a plurality of angularly related surfaces on the exterior of the body.

3. A fishing jig including, an elongate body of transparent material having a longitudinal opening extending therethrough, there being a plurality of grooves in the wall of the opening, and light reflecting material covering the wall of the opening and its grooves.

4. A fishing jig including, a body of transparent material having an opening, the walls of the opening being corrugated, and light reflecting material on the walls of the opening.

5. A fishing jig including, a body of transparent material having an opening, there being a plurality of circumferential grooves in the wall of the opening, the walls of the grooves being flat, and light reflecting material on the walls of the grooves.

6. A fishing jig, including, an elongate body of transparent material having a longitudinal opening, light reflecting facet surfaces on the wall of the opening, a shank extending through the opening, and means sealing the ends of the opening and holding the shank out of contact with the body.

7. A fishing jig including, an ellipsoidal body of transparent material having a longitudinal opening, light reflecting material on the wall of the opening, a shank extending through the opening, and means closing the ends of the opening and holding the shank spaced from the walls of the opening, said means including cupped caps on the shank fitting over and sealing about the reduced end portions of the ellipsoidal body.

8. A fishing jig including, an ellipsoidal body of transparent material having a substantially cylindrical longtitudinal opening, light reflecting material on the walls of the opening, and means closing the ends of the opening and holding the shank spaced from the walls of the opening including cupped caps on the shank fitting over the end portions of the ellipsoidal body, and sealing washers in the cupped caps.

WARREN G. CARTER.
EUGENE P. CHANDLER.